United States Patent
Aoki et al.

(10) Patent No.: US 10,053,235 B2
(45) Date of Patent: Aug. 21, 2018

(54) METHOD FOR MOUNTING AIRCRAFT ENGINE

(71) Applicant: MITSUBISHI AIRCRAFT CORPORATION, Aichi (JP)

(72) Inventors: Makoto Aoki, Tokyo (JP); Kenichiro Yamazaki, Tokyo (JP); Jingo Tateiwa, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 271 days.

(21) Appl. No.: 14/812,129

(22) Filed: Jul. 29, 2015

(65) Prior Publication Data
US 2016/0052646 A1   Feb. 25, 2016

(30) Foreign Application Priority Data
Aug. 25, 2014   (JP) ................................ 2014-170243

(51) Int. Cl.
  *B64F 5/50*   (2017.01)
  *B64F 5/00*   (2017.01)
  *F01D 25/28*   (2006.01)
  *F02C 7/20*   (2006.01)

(52) U.S. Cl.
  CPC ............. *B64F 5/0036* (2013.01); *B64F 5/50* (2017.01); *F01D 25/285* (2013.01); *F02C 7/20* (2013.01); *F05D 2230/64* (2013.01); *F05D 2230/68* (2013.01)

(58) Field of Classification Search
  CPC ...... B64F 5/10; B64F 5/40; B64F 5/50; B23P 19/10; B23P 2700/01; B23P 2700/50; F01D 25/28; F01D 25/285; F05D 2230/64; F05D 2230/68
  USPC ........................................ 248/346.01, 346.02
  See application file for complete search history.

(56) References Cited

U.S. PATENT DOCUMENTS

| | | | |
|---|---|---|---|
| 4,672,732 A * | 6/1987 | Ramspacher | F16B 5/02 29/429 |
| 4,805,851 A | 2/1989 | Herbst | |
| 5,575,607 A * | 11/1996 | Grout | B66C 19/00 212/344 |
| 5,816,367 A * | 10/1998 | Lilja | F01D 25/285 187/244 |

(Continued)

FOREIGN PATENT DOCUMENTS

| | | |
|---|---|---|
| JP | S58-019203 U1 | 7/1983 |
| JP | S59-168105 U1 | 11/1984 |

(Continued)

OTHER PUBLICATIONS

Japanese Office Action for Application No. 2014-170243, dated May 8, 2018.

*Primary Examiner* — Christopher M Koehler
(74) *Attorney, Agent, or Firm* — Pearne & Gordon LLP

(57) ABSTRACT

The present invention provides a method for mounting an aircraft engine, which enables to speed up a mounting work by facilitating positioning of an engine with respect to a pylon. The method for mounting an aircraft engine, including: lifting up an engine of an aircraft toward a pylon that is a mounting object; and when the engine reaches a predetermined position, fixing the engine to the pylon, wherein guides that perform horizontal positioning of the engine with respect to the pylon are respectively provided on a front side and a rear side of the engine.

10 Claims, 7 Drawing Sheets

(56) References Cited

U.S. PATENT DOCUMENTS

| | | | |
|---|---|---|---|
| 5,871,177 A * | 2/1999 | Demouzon | B64D 27/18 244/54 |
| 6,139,639 A | 10/2000 | Kitamura et al. | |
| 6,170,141 B1 * | 1/2001 | Rossway | F01D 25/285 206/319 |
| 6,485,247 B1 * | 11/2002 | Groves | B66F 7/20 180/125 |
| 7,506,433 B2 * | 3/2009 | Sawada | B62D 25/145 29/466 |
| 2005/0269446 A1 | 12/2005 | Dron | |
| 2008/0011932 A1 * | 1/2008 | Stretton | B66C 1/10 248/544 |
| 2008/0296430 A1 | 12/2008 | Combes et al. | |
| 2009/0308972 A1 * | 12/2009 | Foster | B64D 27/26 244/54 |
| 2010/0155566 A1 * | 6/2010 | Linz | B66C 1/107 248/554 |
| 2012/0224944 A1 | 9/2012 | Boulanger et al. | |
| 2012/0272496 A1 * | 11/2012 | Herbold | F01D 25/285 29/402.03 |
| 2015/0136935 A1 * | 5/2015 | Hallam | F01D 25/285 248/554 |
| 2015/0361894 A1 * | 12/2015 | Murphy | F02C 7/20 29/888.012 |

FOREIGN PATENT DOCUMENTS

| | | |
|---|---|---|
| JP | H01-131355 A | 5/1989 |
| JP | H08-182954 A | 7/1996 |
| JP | 2009-506925 A | 2/2002 |
| JP | 2005-280690 A | 10/2005 |
| JP | 2012-161864 A | 8/2012 |
| JP | 2013-511643 A | 4/2013 |

\* cited by examiner

METHOD FOR MOUNTING AIRCRAFT ENGINE

BACKGROUND OF THE INVENTION

Field of the Invention

The present invention relates to a method for mounting an aircraft engine to a pylon strut.

Description of the Related Art

A turbofan engine of an aircraft is mounted to a wing via a structural member called a pylon strut (simply referred to as a pylon below).

Normally, an engine manufactured in a manufacturing plant is carried to an assembly plant separate from the manufacturing plant, and is mounted to a wing therein. The engine is carried in a state placed on a dolly, and is mounted to the wing while being placed on the dolly. It is necessary to lift up the engine to a mounting position on a pylon, and thus, a structure having a lifting function in a state in which the dolly is held is used (for example, JP 2013-511643A).

The work of mounting the engine to the pylon requires a considerable amount of time since the engine has a large weight, and it is necessary to perform the work while accurately performing relative positioning with respect to the pylon.

Thus, an object of the present invention is to provide a method for mounting an aircraft engine, which enables mounting work to be sped up by facilitating positioning of an engine with respect to a pylon.

SUMMARY OF THE INVENTION

In view of the above object, the present application proposes a first invention and a second invention.

The first invention is a method for mounting an aircraft engine, including: lifting up an engine of an aircraft toward a pylon that is a mounting object; and when the engine reaches a predetermined position, fixing the engine to the pylon, wherein a guide that performs horizontal positioning of the engine with respect to the pylon is provided decentrally in a longitudinal direction of the engine.

In the mounting method of the present invention, when the engine includes a shear pin that transmits thrust of the engine to the pylon, and the pylon includes a pin retainer into which the shear pin is fitted, the guide is preferably provided close to the shear pin.

In the mounting method of the present invention, when the engine includes an engine mount including the shear pin, and the pylon includes a pylon mount including the pin retainer, the guide may be laid between the engine mount and the pylon mount.

In the mounting method of the present invention, a planar gauge that confirms parallelism with the engine mount or the pylon mount is preferably interposed between the engine mount and the pylon mount.

In a case in which the planar gauge is interposed, a plurality of types of planar gauges having different thicknesses is preferably used, which includes at least a first form and a second form described below.

In the first form, the plurality of types of planar gauges having different thicknesses are originally laminated and interposed between the engine mount and the pylon mount, and the planar gauges are withdrawn from a planar gauge having a larger thickness according to a degree in which the engine is lifted up.

Also, in the second form, a procedure in which a first planar gauge is originally interposed between the engine mount and the pylon mount, and is withdrawn after lifting up the engine by a predetermined amount, and instead, a second planar gauge thinner than the first planar gauge is interposed between the engine mount and the pylon mount, and is withdrawn after lifting up the engine by a predetermined amount is repeated a required number of times.

The method of using the planar gauge described above can be performed independently of the first invention of the present application in which the guide is used. That is, the second invention of the present application is a method for mounting an aircraft engine, including: lifting up an engine of an aircraft toward a pylon that is a mounting object; and when the engine reaches a predetermined position, fixing the engine to the pylon, wherein when the engine includes an engine mount used for fixation to the pylon, and the pylon includes a pylon mount used for fixation to the engine mount, a planar gauge that confirms parallelism with the engine mount or the pylon mount is interposed between the engine mount and the pylon mount during the lifting-up.

The above preferable forms of the first invention can be appropriately applied to the second invention of the present application.

In accordance with the first invention of the present application described above, since the guide that performs the horizontal positioning of the engine with respect to the pylon is provided on each of a front side and a rear side of the engine, the engine is mounted to the pylon while the horizontal positioning with respect to the pylon is being effected.

Also, in accordance with the second invention of the present application, since an interval between the engine and the pylon can be apparently reduced by using the planar gauge, parallelism between the engine and the pylon can be easily and accurately confirmed. Therefore, in accordance with the second invention, the engine is mounted to the pylon while vertical positioning with respect to the pylon is being effected.

BRIEF DESCRIPTION OF THE DRAWINGS

FIG. 2A is a side view; and FIG. 2B is a front view;

FIG. 3A is a side view; and FIG. 3B is a front view;

FIG. 5A shows a rod guide on a front side; and FIG. 5B shows a rod guide on a rear side;

FIG. 6A shows a state in which a maximum number of planar gauges are originally interposed; and FIG. 6B shows a process in which the planar gauges are withdrawn one by one; FIG. 7A shows a front side; and FIG. 7B shows a rear side.

DETAILED DESCRIPTION OF THE PREFERRED EMBODIMENTS

In the following, an embodiment of a method for mounting an engine of the present invention will be described.

Figure 1:
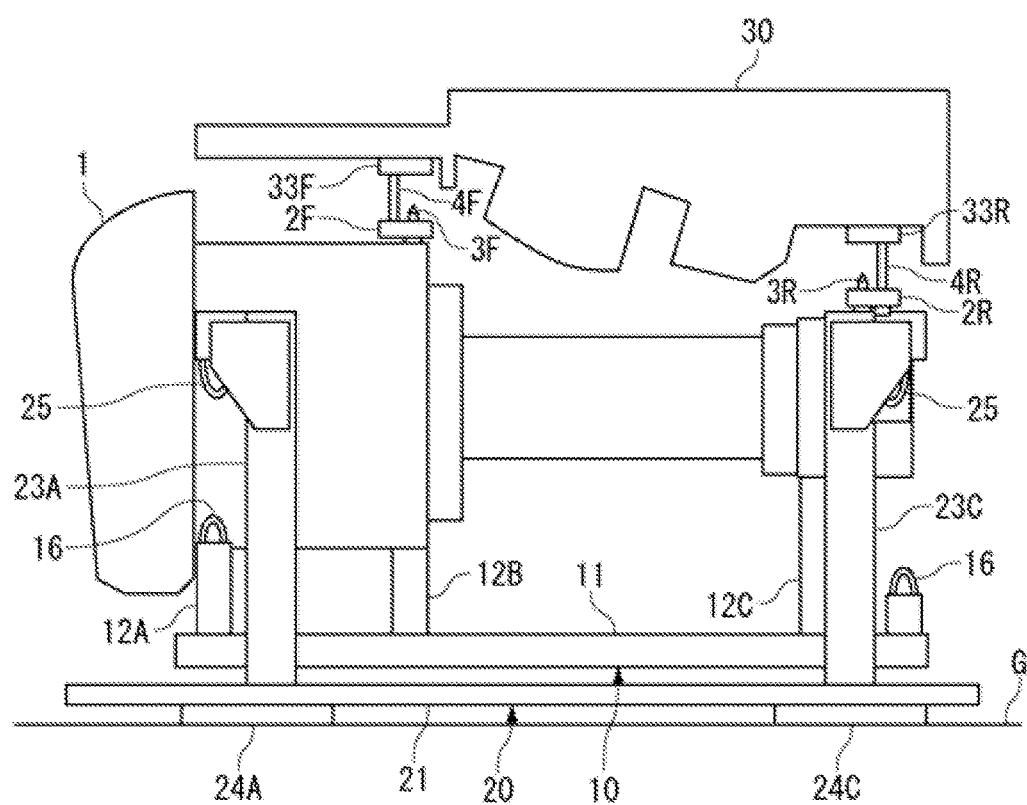
FIG. 1 is a view illustrating a state in which an engine is arranged immediately below a pylon in a method for mounting an engine according to a present embodiment.

The present embodiment is featured in that a work of mounting an aircraft engine 1 to a pylon 30 that is provided on a main wing can be quickly performed as shown in FIG. 1. The feature is achieved by horizontal positioning of the engine 1 by rod-like guides 4F and 4R, and vertical positioning of the engine 1 by a thickness adjustment gauges G1-G5, which will be described in detail later.

The present embodiment can be applied to a case in which the newly-manufactured engine 1 is mounted to an airframe, or a case in which the engine 1 that has been temporarily removed in inspection/maintenance of an aircraft is mounted. Note that a front/a rear in the present embodiment accord with a front/a rear of the engine 1 (a left side and a right side in FIG. 1 are the front and the rear, respectively). Also, an up-down direction in FIG. 1 corresponds to a vertical direction, and a right-left direction in FIG. 1 corresponds to a horizontal direction.

At the time of mounting the engine 1, the engine 1 is placed on a dolly 10 that is supported on a carrier 20, and is carried to a position immediately below the pylon 30 that is a direct mounting object as shown in FIG. 1. The dolly 10 on which the engine 1 is placed is then lifted up toward the pylon 30 by chain hoists 26 (omitted in FIGS. 1 to 3B. see FIGS. 7A, 7B), as lifting means provided in the carrier 20.

[Configuration of Elements Regarding Mounting]

The engine 1 includes two engine mounts, i.e., engine mounts 2F and 2R at a longitudinal interval. The engine mount 2F includes two shear pins 3F and the engine mount 2R includes two shear pins 3R. The shear pins 3F and 3R are fitted into pin retainers 36F and 36R (see FIGS. 5A, 5B) that are formed in pylon mounts 33F and 33R provided in the pylon 30. Therefore, thrust of the engine 1 is transmitted to the pylon mounts 33F and 33R and the pylon 30 through the shear pins 3F and 3R of the engine mounts 2F and 2R.

The pylon 30 includes the pair of pylon mounts 33F and 33R corresponding to the pair of engine mounts 2F and 2R provided at the front and the rear of the engine 1. When the engine mounts 2F and 2R are fastened to the pylon mounts 33F and 33R with bolts, the engine 1 is mounted to the main wing via the pylon 30. Since the shear pins 3F and 3R of the engine mounts 2F and 2R are fitted into the pin retainers 36F and 36R of the pylon mounts 33F and 33R, the thrust of the engine 1 can be transmitted to the pylon 30.

In consideration of the thrust transmitting function of the shear pins 3F and 3R, a tolerance of fit between the shear pins 3F and 3R and the pin retainers 36F and 36R is set to be very small. Therefore, if the shear pins 3F and 3R are forcibly fitted into the pin retainers 36F and 36R when axes of the shear pins 3F and 3R and the pin retainers 36F and 36R are misaligned to be inclined with respect to each other, the shear pins 3F and 3R or peripheries of the pin retainers 36F and 36R may be damaged. When damaged, the shear pins 3F and 3R cannot fulfill the function of transmitting the thrust. Therefore, in order to align the axes of the shear pins 3F and 3R and the pin retainers 36F and 36R in a process of mounting the engine 1, it is necessary to perform vertical positioning such that abutment surfaces of the engine mounts 2F and 2R and the pylon mounts 33F and 33R are always parallel to each other. It can be said that this is one of causes that the work of mounting the engine 1 requires a lot of time.

The rod-like guides 4F and 4R are laid between the engine mount 2F and the pylon mount 33F, and between the engine mount 2R and the pylon mount 33R, respectively. The guides 4F and 4R contribute to horizontal positioning between the engine mount 2F and the pylon mount 33F, and between the engine mount 2R and the pylon mount 33R. The guides 4F and 4R will be described in detail later.

The engine 1 is placed on the dolly 10 in a manufacturing site of the engine 1, and a movement of the engine 1 is restricted by appropriate means provided with the dolly 10. The dolly 10 is then carried together with the engine 1 to a mounting site of the engine 1.

Figure 2A:
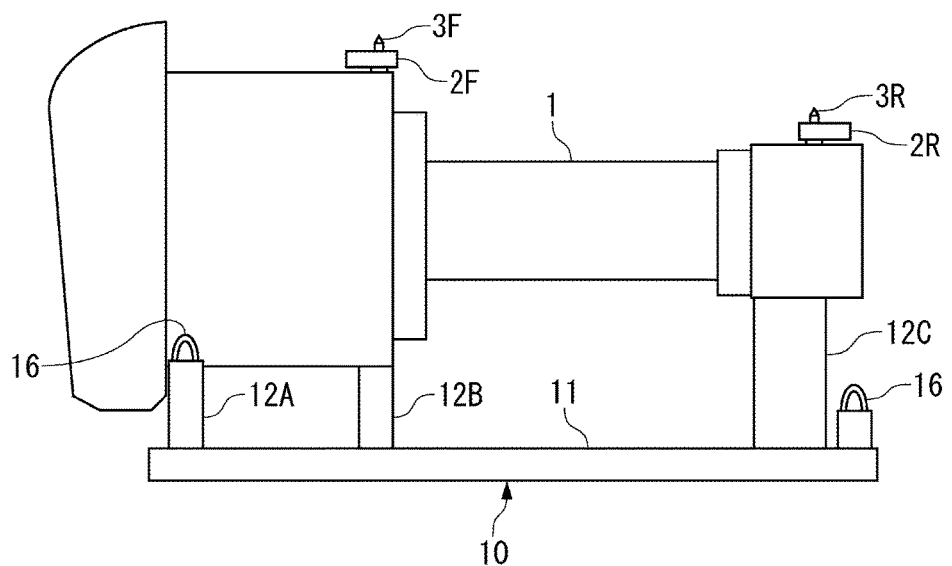
FIGS. 2A, 2B are views illustrating the engine and a dolly on which the engine is placed according to the present embodiment.
Figure 2B:
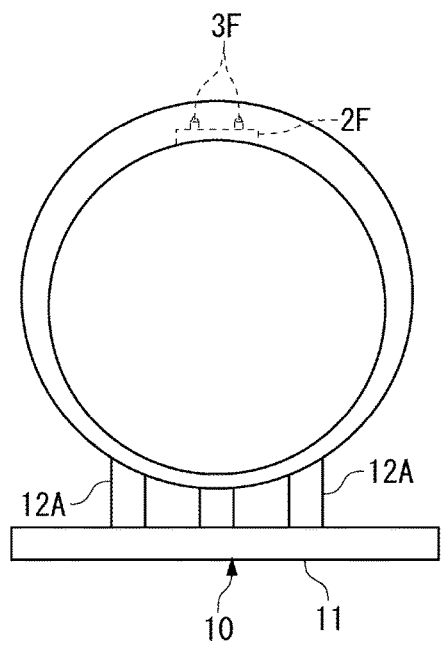

As shown in FIGS. 1 and 2A,2B, the dolly 10 includes a base 11 having a rectangular plane shape, and supports 12A, 12B, and 12C provided on a top surface of the base 11. The supports 12A, 12B, and 12C are arranged in this order from a front side, and respectively support the engine 1. Hooks 16 to which the chain hoists 26 for hoisting up the dolly 10 are locked are provided at four corners of the top surface of the base 11.

Although the dolly 10 is assumed to be lifted up and carried similarly to a logistics pallet, the dolly 10 may be also enabled to run by providing wheels on a bottom surface. Also, the dolly 10 is formed of a high strength steel or other metal materials. The same applies to the carrier 20. Moreover, as long as the dolly 10 can move while holding the engine 1, the dolly 10 is not limited to the above structure.

Figure 3A:
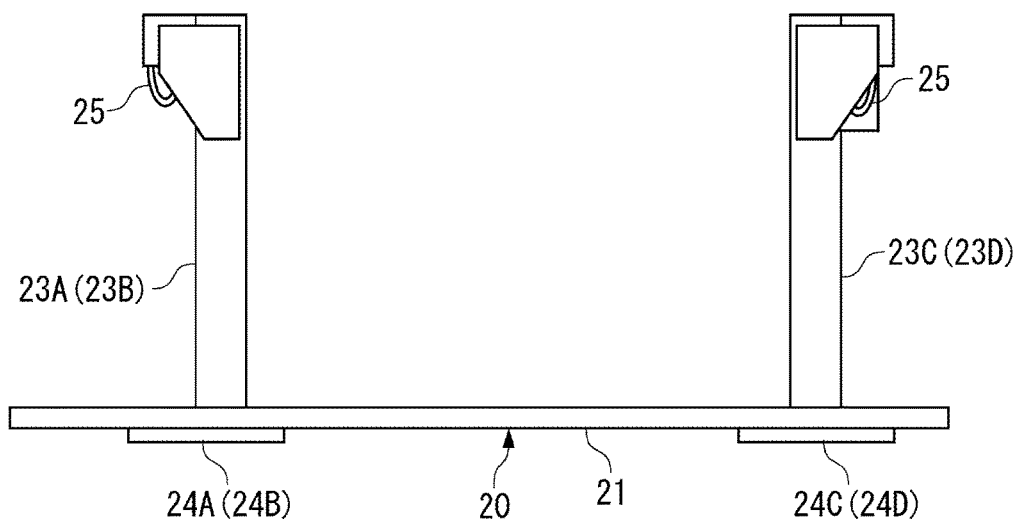
FIGS. 3A, 3B are views illustrating a carrier according to the present embodiment.
Figure 3B:
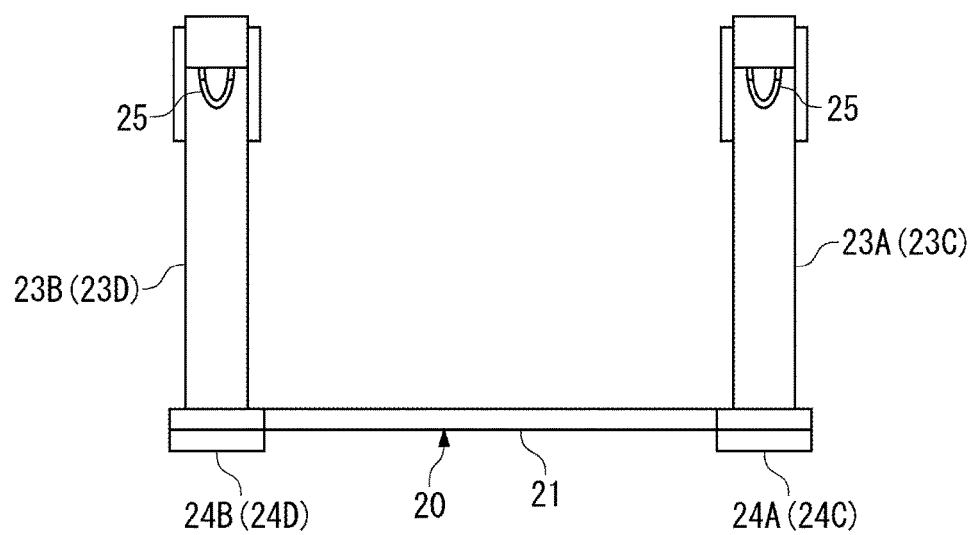

As shown in FIGS. 1 and 3A,3B, the carrier 20 moves the engine 1, which is carried to the mounting site via the dolly 10, while holding the dolly 10 including the engine 1. When the engine 1 is moved to a position immediately below the pylon 30, the carrier 20 lifts up the engine 1 toward the pylon 30.

The carrier 20 includes a base frame 21 having a square U-shaped plane shape, posts 23A, 23B, 23C, and 23D erected from substantially four corners on a top surface side of the base frame 21, and surface plates 24A, 24B, 24C, and 24D provided on substantially four corners on a bottom surface side of the base frame 21.

The carrier 20 accommodates the dolly 10 that holds the engine 1 in a region surrounded by the base frame 21 and the posts 23A, 23B, 23C, and 23D, and pulls up the dolly 10 including the engine 1 by using the chain hoists 26 that are manually operated by an operator. In order to allow the chain hoists 26 to work, each of the posts 23A, 23B, 23C, and 23D includes a hook 25 that suspends the chain hoist 26. Note that only a portion of a chain of the chain hoist 26 is shown in FIG. 1.

[Mounting Procedure of the Engine 1]

A procedure for mounting the engine 1 to the pylon 30 by using the dolly 10 and the carrier 20 described above will now be described.

Figure 4A:
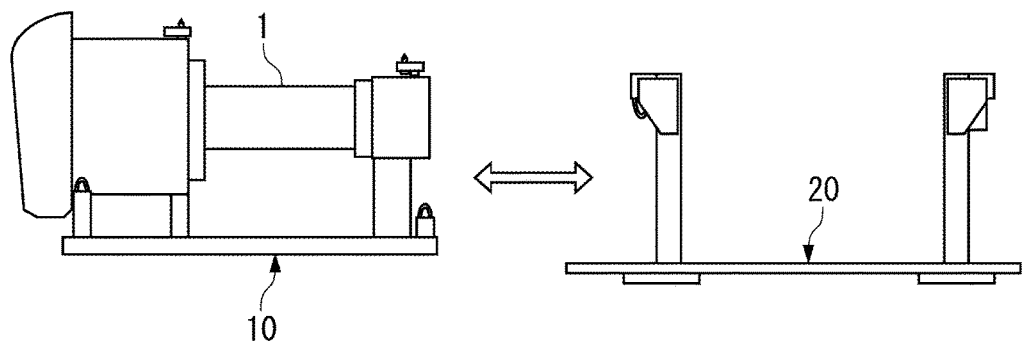
FIGS. 4A, 4B are views illustrating main procedure steps of the method for mounting an engine according to the present embodiment.
Figure 4B:
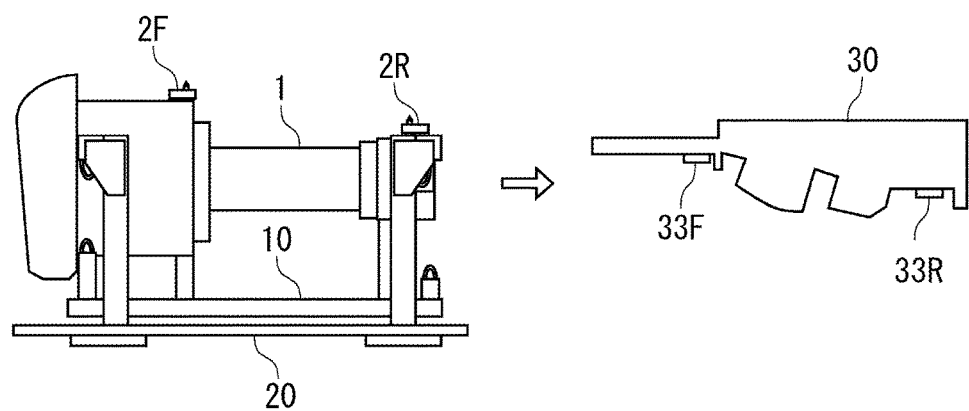

First, the dolly 10 on which the engine 1 is placed is moved to an accommodation space of the carrier 20, and is held by the carrier 20 as shown in FIG. 4A. Subsequently, as shown in FIG. 4B and FIG. 1, the carrier 20 holding the engine 1 and the dolly 10 is moved to a predetermined position immediately below the pylon 30.

[Horizontal Positioning]

Subsequently, as shown in respective upper views of FIGS. 5A and 5B, the guides 4F and 4R are installed between the engine mounts 2F and 2R and the pylon mounts 33F and 33R.

Each of the guides 4F and 4R is a bolt-shaped member composed of a shaft portion 4A and a head portion 4B, and a male thread is formed on a distal end portion of the shaft portion 4A.

To install the guide 4F, the engine mount 2F has a female thread with which the male thread of the guide 4F is engaged, and a shaft hole 34 through which the shaft portion 4A of the guide 4F reciprocates is formed penetrating the pylon mount 33F. Moreover, a shaft hole 35 that leads to the shaft hole 34 and through which the shaft portion 4A and the head portion 4B of the guide 4F reciprocate is formed penetrating a body portion of the pylon 30 in a portion corresponding to the shaft hole 34.

The guide 4F passes through the shaft hole 35 of the pylon 30 and the shaft hole 34 of the pylon mount 33F, and the male thread on the distal end portion of the shaft portion 4A is engaged with the female thread of the engine mount 2F. Therefore, while the guide 4F can be lifted in the vertical direction integrally with the engine mount 2F, the pylon mount 33F, at this time, restricts a horizontal movement of the guide 4F. Accordingly, the horizontal positioning between the engine mount 2F and the pylon mount 33F is effected by the guide 4F installed therebetween.

Figure 5A:
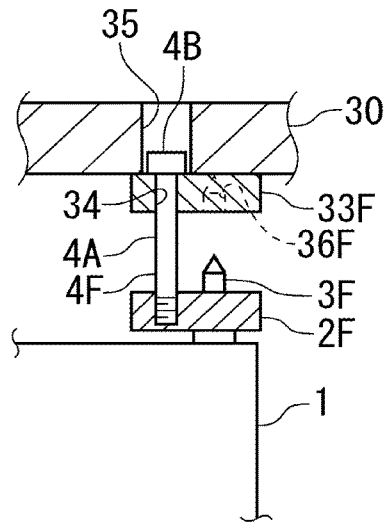
FIGS. 5A, 5B are views illustrating an operation of a rod guide according to the present embodiment.
Figure 5B:
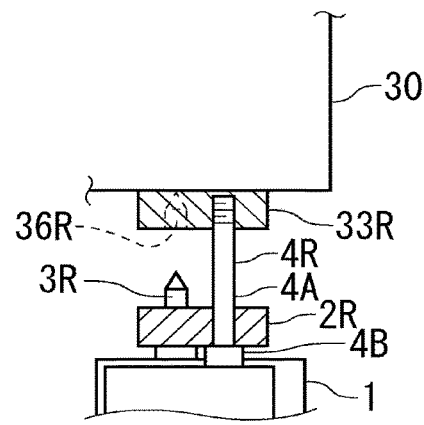
Figure 5B:
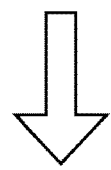
Figure 5B:
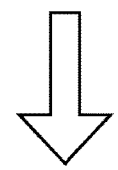
Figure 5B:
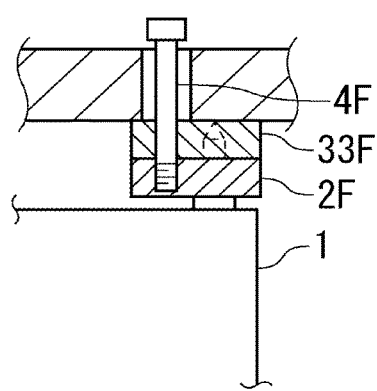
Figure 5B:
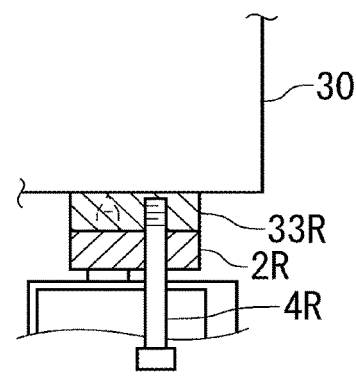

Although only the single guide is shown in FIGS. 5A,5B as the guides 4F and 4R between the engine mount 2F and the pylon mount 33F and between the engine mount 2R and the pylon mount 33R, two or more guides may be installed corresponding to the number of the shear pins 3F and 3R.

The guide 4R is also installed between the engine mount 2R and the pylon mount 33R located on a rear side as shown in the upper view of FIG. 5B. The guide 4R is the same as that installed between the engine mount 2F and the pylon mount 33F on the front side except that the shaft portion 4A and the head portion 4B are upside down. Thus, a further description is omitted.

When the guides 4F and 4R are installed as described above, the dolly 10 is lifted up until the engine mount 2F comes into abutment with the pylon mount 33F and the engine mount 2R comes into abutment with the pylon mount 33R as shown in lower views of FIGS. 5A and 5B. In this process, the engine 1 approaches the pylon 30 while the positioning between the engine mount 2F and the pylon mount 33F is being effected by the guide 4F, and the positioning between the engine mount 2R and the pylon mount 33R is being effected by the guide 4R.

[Vertical Positioning]

While the guides 4 effectively used for the horizontal positioning of the engine 1 has been described above, the present embodiment proposes an effective method for the vertical positioning of the engine 1 as described below.

Figure 6A:
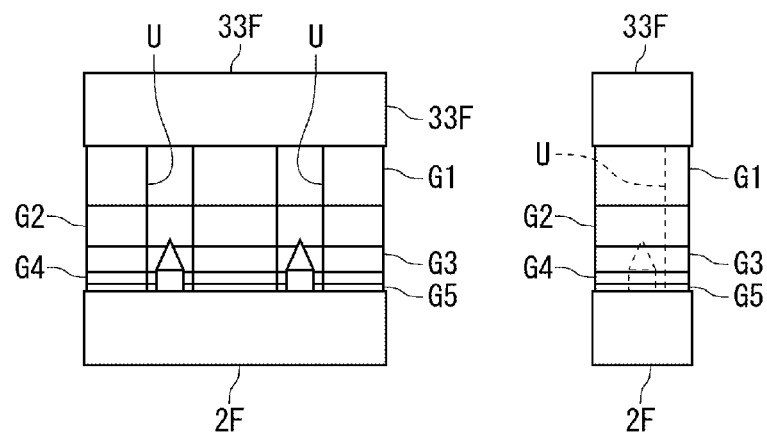
FIGS. 6A, 6B are views illustrating a method of using planar gauges according to the present embodiment.

The method is used for confirming parallelism between the engine mount 2F and the pylon mount 33F in a process of mounting the engine 1 by inserting planer gauges G1 to G5 between the engine mount 2F and the pylon mount 33F as shown in FIG. 6A. Although the engine mount 2F and the pylon mount 33F are used as an example here, the planar gauges G1 to G5 are similarly used for the engine mount 2R and the pylon mount 33R as well.

Figure 6B:
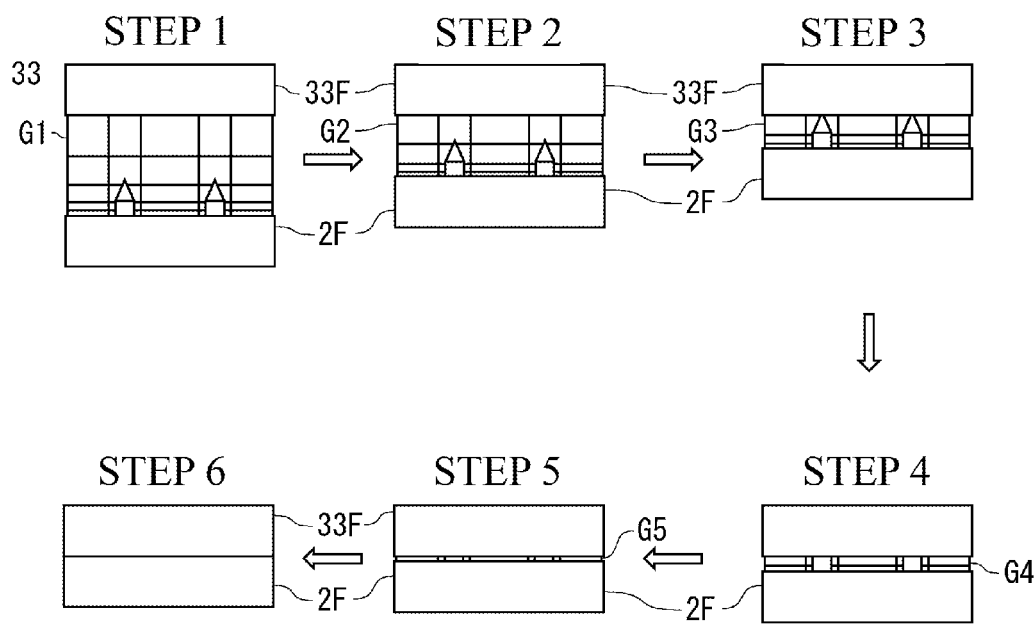

Note that FIGS. 6A,6B illustrate only the engine mount 2F and the pylon mount 33F necessary for describing a function of the planar gauges G1 to G5. Also, a left side of FIG. 6A is a front view, and a right side thereof is a side view.

While the planar gauges G1 to G5 are rectangular flat members with the same outer size, the planar gauges G1 to G5 have different thicknesses. When the thicknesses of the planar gauges G1 to G5 are T1 to T5, respectively, a relationship of T1>T2>T3>T4>T5 is obtained. The planar gauges G1 to G5 have flatness according to a parallel level between the engine mount 2F and the pylon mount 33F required for mounting the engine 1.

While the planar gauges G1 to G5 have a rectangular plane shape, a U-shaped groove U that accommodates the shear pin 3F is formed. The groove U is formed so as to be depressed to a predetermined position from one of long sides of each of the planar gauges G1 to G5 toward the other of the long sides.

As shown in FIG. 6A, a laminate obtained by laminating all the planar gauges G1 to G5 from the thicker to the thinner planar gauges from the top is originally placed on the engine mount 2F. Subsequently, the dolly 10 on which the engine 1 is placed is lifted up. When the planar gauge G1 located at a highest position reaches a position almost in touch with the pylon mount 33F (step 1 in FIG. 6B), the lifting-up of the dolly 10 is stopped. At this point, parallelism between the planar gauge G1, i.e., the engine mount 2F and the pylon mount 33F is confirmed, and if desired parallelism is not obtained, the parallelism is adjusted. The adjustment of the parallelism will be described later. Although FIG. 6B shows no gap between the planar gauge G1 at the highest position and the pylon mount 33F, there is actually a very small gap.

When the desired parallelism between the planar gauge G1 and the pylon mount 33F is obtained, the planar gauge G1 is withdrawn, and the dolly 10 on which the engine 1 is placed is then lifted up. When the planar gauge G2 located at a highest position reaches a position almost in touch with the pylon mount 33F (step 2 in FIG. 6B), the lifting-up of the dolly 10 is stopped. Parallelism between the planar gauge G2 and the pylon mount 33F is confirmed, and if desired parallelism is not obtained, the parallelism is adjusted.

When the desired parallelism between the planar gauge G2 and the pylon mount 33F is obtained, the planar gauge G2 is withdrawn, and the dolly 10 on which the engine 1 is placed is then lifted up. When the planar gauge G3 located at a highest position reaches a position almost in touch with the pylon mount 33F (step 3 in FIG. 6B), the lifting-up of the dolly 10 is stopped. Parallelism between the planar gauge G3 and the pylon mount 33F is confirmed, and if desired parallelism is not obtained, the parallelism is adjusted.

Thereafter, the withdrawal of the planar gauges G3 to G5, the lifting-up/the stop of the dolly 10, and the confirmation/the adjustment of the parallelism are sequentially performed according to the above procedure. Finally, after the thinnest planar gauge G5 is withdrawn, the dolly 10 is lifted up until the engine mount 2F comes into abutment with the pylon mount 33F (step 6 in FIG. 6B). The engine mount 2F and the pylon mount 33F are then fastened by predetermined fastening means, and the engine 1 is thereby mounted to the pylon 30 (the main wing).

[Configuration of a Lifting Mechanism]

Next, a mechanism for lifting the dolly 10 on which the engine 1 is placed will be described with reference to FIGS. 7A,7B.

The mechanism can be suitably used in the present embodiment, and lifts the dolly 10 by using a chain hoist. Note that the chain hoist here is a manually-operated chain hoist. Also, only the base 11 of the dolly 10 is shown.

Figure 7A:
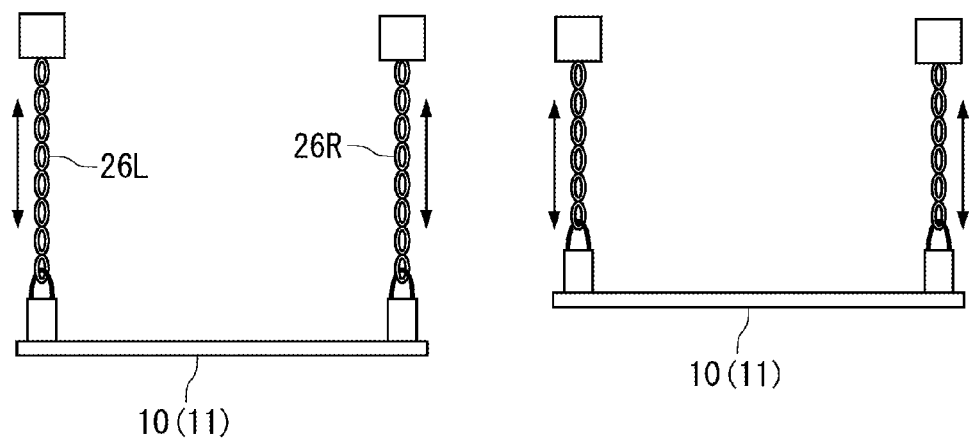
FIGS. 7A, 7B show an outline of a method of towing the dolly according to the present embodiment.
Figure 7B:
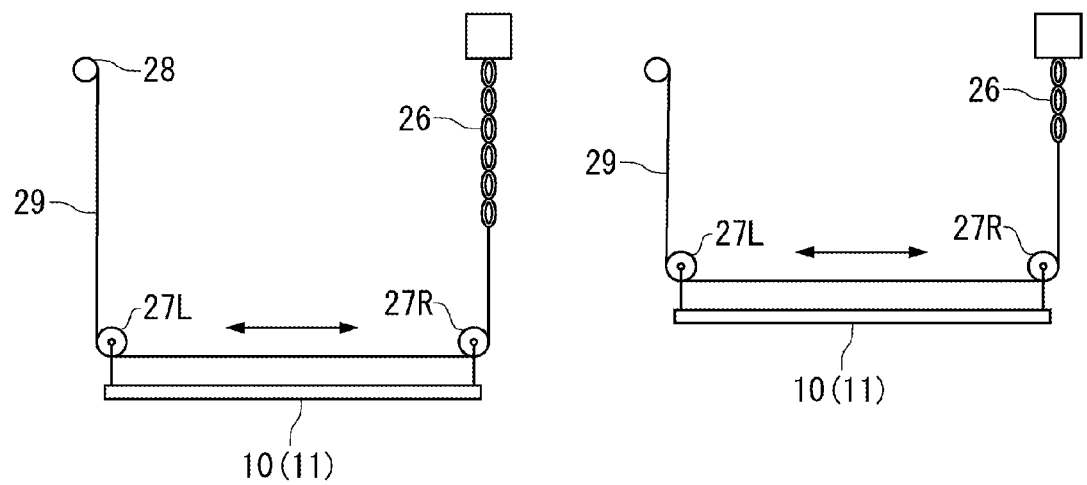

In the lifting mechanism shown in FIGS. 7A,7B, on a front side of the dolly 10, a pair of (two) chain hoists 26L and 26R that lift the dolly 10 (only the base 11 is shown) are connected to both end portions in a width direction (i.e., a right-left direction in FIGS. 7A,7B) as shown in FIG. 7A. The chain hoist 26L and the chain hoist 26R can independently lift the dolly 10. When only the chain hoist 26L on a left side is wound up, a left side of the dolly 10 is lifted up. When only the chain hoist 26R on a right side is wound up, a right side of the dolly 10 is lifted up. By adjusting a wind-up amount of each of the chain hoists 26L and 26R, the parallelism of the engine mount 2F with respect to the pylon mount 33F is adjusted.

Upper hooks of the chain hoists 26L and 26R are locked to the hooks 25 of the posts 23A and 23B of the carrier 20, respectively.

On the other hand, on a rear side of the dolly 10, lifting is performed by using only a single chain hoist 26 as shown in FIG. 7B. To this end, pulleys 27L and 27R are provided at both ends in a width direction W of the dolly 10, and a locking end 28 whose position is fixed is provided in the post 23C (23D) of the carrier 20. A towing wire 29, one end of which is connected to a distal end of the chain hoist 26, and the other end of which is connected to the locking end 28, is provided. The towing wire 29 is stretched over the pulleys 27L and 27R, and the dolly 10 is thereby suspended by the chain hoist 26 and the towing wire 29 via the pulleys 27L and 27R.

Since the other end of the towing wire 29 is connected to the locking end 28, the dolly 10 can be lifted up via the pulleys 27L and 27R when the chain hoist 26 is wound up. Since the towing wire 29 and the pulleys 27L and 27R slide on each other during the lifting process, the dolly 10 can maintain a horizontal state.

[Effect of the Embodiment]

Next, effects produced by the present embodiment will be described.

[Effects by Using the Guides 4]

First, in the present embodiment, the engine 1 is mounted to the pylon 30 by installing the guides 4F and 4R between the engine mounts 2F and 2R and the pylon mounts 33F and 33R. Therefore, the engine 1 is mounted to the pylon 30 while the horizontal positioning with respect to the pylon 30 is being effected by the guides 4F and 4R. It is thus possible to smoothly insert the shear pins 3F and 3R of the engine mounts 2F and 2R into the pin retainers 36F and 36R of the pylon mounts 33F and 33R.

Particularly, in accordance with the present embodiment, since the guides 4F and 4R are provided between the engine mount 2F and the pylon mount 33F on the front side, and between the engine mount 2R and the pylon mount 33R on the rear side, respectively, the insertion of both of the shear pin 3F into the pin retainer 36F on the front side, and the shear pin 3R into the pin retainer 36R on the rear side can be smoothly performed. Moreover, in the present embodiment, since the guides 4F and 4R are provided between the engine mounts 2F and 2R and the pylon mounts 33F and 33R so as to be close to the shear pins 3F and 3R, accuracy of positioning the shear pins 3F and 3R is high.

In the present embodiment, the guide 4F is fixed to the engine mount 2F on the front side, and the guide 4R is fixed to the pylon mount 33R on the rear side. However, the method of installing the guides 4 is not limited thereto, and any method may be employed. For example, the guide 4F may be fixed to the pylon mount 33F on the front side, and the guide 4R may be fixed to the engine mount 2R on the rear side.

Also, as long as the guides 4F and 4R can perform the horizontal positioning, any form may be employed. In addition to the above columnar shape, members having various forms, such as a prism shape and a flat plate shape, may be used as the guides 4F and 4R.

[Effects by Using the Planar Gauges G1 to G5]

Next, in the present embodiment, intervals between the engine mounts 2F and 2R and the pylon mounts 33F and 33R are apparently reduced by using the planar gauges G1 to G5. Thus, an operator can visually confirm the parallelism therebetween with high accuracy. Moreover, the engine 1 is mounted to the pylon 30 by successively confirming the parallelism. Since the engine 1 is mounted to the pylon 30 while the vertical positioning with respect to the pylon 30 is being effected as described above, it is possible to smoothly insert the shear pins 3F and 3R of the engine mounts 2F and 2R into the pin retainers 36F and 36R of the pylon mounts 33F and 33R.

Particularly, in the present embodiment, the planar gauges G1 to G5 having different thicknesses are used, and the planar gauges are withdrawn sequentially from the planar gauge G1 having a larger thickness as the engine mounts 2F and 2R approach the pylon mounts 33F and 33R in the process of lifting up the engine 1. The parallelism between the engine mounts 2F and 2R and the pylon mounts 33F and 33R are frequently confirmed and adjusted as the engine mounts 2F and 2R approach the pylon mounts 33F and 33R as described above. It is thus possible to smoothly insert the shear pins 3F and 3R into the pin retainers 36F and 36R.

Although the planar gauges G1 to G5 are originally interposed between the engine mount 2 and the pylon mount 33 in the present embodiment, the present invention is not limited thereto. For example, only the planar gauge G1 is originally interposed between the engine mount 2 and the pylon mount 33. The dolly 10 is lifted up to a predetermined position and stopped, and the planar gauge G1 is withdrawn. Instead, the planar gauge G2 is interposed between the engine mount 2 and the pylon mount 33. The dolly 10 is then lifted up to a predetermined position and stopped, and the planar gauge G2 is withdrawn. Instead, the planar gauge G3 is interposed between the engine mount 2 and the pylon mount 33. Thereafter, the planar gauges G4 and G5 are inserted and withdrawn in this order in a similar manner to the above procedure, so that the parallelism between the engine mounts 2F and 2R and the pylon mounts 33F and 33R can be frequently confirmed and adjusted.

Also, although the example in which all the planar gauges G1 to G5 used in the embodiment have different thicknesses has been described in the above embodiment, the present invention is not limited thereto. Planar gauges having the same thickness may be used by changing the number of gauges to be withdrawn. As a most extreme example, a plurality of planar gauges G having about the same thickness as that of the above planar gauge G5 are prepared, and are originally interposed as a laminate between the engine mount 2 and the pylon mount 33. The number of the planar gauges G to be withdrawn first is set to a maximum number N, and the number of the planar gauges G to be subsequently withdrawn may be reduced, for example, by setting the number to ½N, ¼N, and ⅛N.

[Effects by the Lifting Mechanism]

Next, in the present embodiment, the manually-operated chain hoists 26L and 26R are used as the lifting mechanism for the dolly 10 on which the engine 1 is placed. Therefore, as compared with an automatic lifting apparatus using a hydraulic driving apparatus or an electric driving apparatus, it is possible to more reliably insert the shear pins 3F and 3R into the pin retainers 36F and 36R. For example, when the automatic lifting apparatus is used, it is not easy, even if displacement is generated between the shear pins 3F and 3R and the pin retainers 36F and 36R, to prevent the shear pins 3F and 3R from being inserted into the pin retainers 36F and 36R with the displacement being generated.

Next, in the present embodiment, since the pulleys 27L and 27R are interposed on the rear side, it is possible to lift the dolly 10, while keeping a predetermined angle, by use of the single chain hoist 26. Therefore, since only the chain hoist 26 needs to be adjusted on the rear side, a burden of the work of mounting the engine 1 can be reduced. By using the chain hoists 26L and 26R capable of independently adjusting the lifting on the front side, and using the pulleys 27L and 27R and the towing wire 29 on the rear side, lateral inclination (an airframe roll angle) on the rear side can be easily adjusted only by an operation amount of the chain hoists 26L and 26R on the front side.

However, in the present invention, the lifting on the right side and the left side may be independently adjusted on the rear side similarly to the front side. The lifting may be adjusted by the single chain hoist 26 by using the pulleys 27L and 27R on the front side similarly to the rear side.

Although the preferred embodiment of the present invention has been described above, the constitutions described in the aforementioned embodiment may be freely selected or appropriately changed into other constitutions without departing from the scope of the present invention.

For example, the configuration of the dolly 10 and the carrier 20 is merely one example, and as long as the dolly 10 holds the engine 1 and is lifted together with the engine 1, and as long as the carrier 20 can lift the dolly 10 on which the engine 1 is placed, another configuration may be employed.

Also, although the chain hoist is used as an example as the manually-operated lifting apparatus, another manually-operated lifting apparatus, e.g., a hydraulic jack may be also used.

What is claimed is:

1. A method for mounting an aircraft engine, comprising: lifting up an engine of an aircraft toward a pylon that is a mounting object; and when the engine reaches a predetermined position, fixing the engine to the pylon,
    wherein a guide that performs horizontal positioning of the engine with respect to the pylon is provided on each of a front side and a rear side of the engine,
    wherein the engine includes a shear pin that transmits thrust of the engine to the pylon,
        the pylon includes a pin retainer into which the shear pin is fitted, and
        the guide is provided close to the shear pin and the guide extends substantially in parallel with the shear pin, and
    wherein the engine includes an engine mount including the shear pin,
        the pylon includes a pylon mount including the pin retainer, and
        the guide is laid between the engine mount and the pylon mount.

2. The method for mounting an aircraft engine according to claim 1,
    wherein the guide is a bolt-shaped member with a shaft portion and a head portion.

3. The method for mounting an aircraft engine according to claim 1,
    wherein the guide is liftable in a vertical direction integrally with the engine mount.

4. The method for mounting an aircraft engine according to claim 1,
    wherein the guide is a bolt-shaped member with a shaft portion and a head portion, and the shaft portion has a male thread on a distal end portion thereof,
    the engine mount has a female thread with which the male thread of the guide is engaged,
    the pylon mount has a through-hole through which the shaft portion of the guide reciprocates in a vertical direction, and
    the pylon mount and the engine mount restrict a horizontal movement of the guide, and thereby the guide performs the horizontal positioning of the engine with respect to the pylon.

5. The method for mounting an aircraft engine according to claim 1,
    wherein the guide is a bolt-shaped member with a shaft portion and a head portion,
    the pylon mount has a first through-hole through which the shaft portion of the guide reciprocates in a vertical direction,
    the pylon has a second through-hole through which the shaft portion and the head portion of the guide reciprocates in a vertical direction, and the second through-hole is formed so as to lead to the first through-hole.

6. The method for mounting an aircraft engine according to claim 1,
    wherein the engine is a turbofan engine.

7. A method for mounting an aircraft engine, comprising: lifting up an engine of an aircraft toward a pylon that is a mounting object and when the engine reaches a predetermined position, fixing the engine to the pylon,
    wherein a guide that performs horizontal positioning of the engine with respect to the pylon is provided on each of a front side and a rear side of the engine,
    wherein the engine includes a shear pin that transmits thrust of the engine to the pylon,
        the pylon includes a pin retainer into which the shear pin is fitted, and
        the guide is provided close to the shear pin,
    wherein the engine includes an engine mount including the shear pin,
        the pylon includes a pylon mount including the pin retainer, and
        the guide is laid between the engine mount and the pylon mount, and
    wherein a planar gauge that confirms parallelism with the engine mount or the pylon mount is interposed between the engine mount and the pylon mount during the lifting-up.

8. The method for mounting an aircraft engine according to claim 7,
    wherein a plurality of types of planar gauges having different thicknesses are used.

9. The method for mounting an aircraft engine according to claim 8,
    wherein the plurality of types of planar gauges having different thicknesses are originally laminated and interposed between the engine mount and the pylon mount, and
    the planar gauges are withdrawn sequentially from a planar gauge having a larger thickness according to a degree in which the engine is lifted up.

10. The method for mounting an aircraft engine according to claim 8,
    wherein a procedure in which a first planar gauge is originally interposed between the engine mount and the pylon mount, and is withdrawn after lifting up the engine by a predetermined amount, and instead, a second planar gauge thinner than the first planar gauge is interposed between the engine mount and the pylon mount, and is withdrawn after lifting up the engine by a predetermined amount is repeated a required number of times.

* * * * *